(12) United States Patent
Duehring (10) Patent No.: US 8,256,543 B2
(45) Date of Patent: Sep. 4, 2012

(54) BICYCLE REAR WHEEL PROPELLED BY TRAILER MOUNTED POWER SUPPLY AND DRIVE TRAIN

(75) Inventor: William K. Duehring, Newport Beach, CA (US)

(73) Assignee: Felt Racing, LLC, Irvine, CA (US)

( * ) Notice: Subject to any disclaimer, the term of this patent is extended or adjusted under 35 U.S.C. 154(b) by 0 days.

(21) Appl. No.: 13/178,370

(22) Filed: Jul. 7, 2011

(65) Prior Publication Data

US 2012/0006604 A1 Jan. 12, 2012

Related U.S. Application Data

(63) Continuation of application No. 12/832,186, filed on Jul. 8, 2010, now Pat. No. 8,056,657.

(51) Int. Cl.
*B62M 6/40* (2010.01)
(52) U.S. Cl. .................. 180/11; 180/206.1; 280/204
(58) Field of Classification Search .................. 280/204; 180/14.1, 14.3, 14.4, 11, 205, 206, 207, 15, 180/16

See application file for complete search history.

(56) References Cited

U.S. PATENT DOCUMENTS

| | | | |
|---|---|---|---|
| 670,179 A | 3/1901 | Lawson | |
| 725,924 A | 1/1903 | Belcher | |
| 770,936 A | 9/1904 | Simpson | |
| 778,148 A | 12/1904 | Robion | |
| 1,401,661 A * | 12/1921 | Wilcox | ............................ 180/11 |
| 1,475,223 A | 11/1923 | Cushman | |
| 4,072,203 A * | 2/1978 | Pierson | ........................ 180/9.44 |
| 4,461,365 A | 7/1984 | Diggs | |
| 6,725,955 B2 | 4/2004 | Bidwell | |
| 2002/0038730 A1 | 4/2002 | Bidwell | |
| 2009/0200096 A1 | 8/2009 | Pittman | |
| 2010/0096197 A1 | 4/2010 | Stoddart | |

FOREIGN PATENT DOCUMENTS

| | | |
|---|---|---|
| DE | 29801947 U1 | 3/1998 |
| GB | 2177053 | 1/1987 |

* cited by examiner

*Primary Examiner* — Ann Marie M Boehler
(74) *Attorney, Agent, or Firm* — Stetina Brunda Garred & Brucker (57) ABSTRACT

A bicycle may tow a trailer for the purposes of carrying a heavy or large object across great distances. A motor may be mounted to the trailer which drives a rear wheel of the bicycle. To this end, a transmission is added to the rear hub of the bicycle which is mechanically coupled to the output shaft of the motor. When the trailer is detached or not used in conjunction with the bicycle, the rider does not have to carry the weight of the motor. Also, this setup provides a stable configuration since the bicycle is pulling the trailer.

12 Claims, 7 Drawing Sheets

BICYCLE REAR WHEEL PROPELLED BY TRAILER MOUNTED POWER SUPPLY AND DRIVE TRAIN

CROSS-REFERENCE TO RELATED APPLICATIONS

The present application is a continuation patent application of U.S. patent application Ser. No. 12/832,186, filed on Jul. 8, 2010 now U.S. Pat. No. 8,056,657.

STATEMENT RE: FEDERALLY SPONSORED RESEARCH/DEVELOPMENT

Not Applicable

BACKGROUND

The present invention relates to a motorized bicycle with a trailer.

Bicycles are utilized for various purposes. One purpose is to transport objects from point A to point B. To this end, bicyclists may place the object in a backpack or other hands-free bag/pouch that attaches to the bicycle to transport the object from point A to point B. The bicyclist may not use his/her hands since the rider uses his/her hands to hold the handlebars and stabilize the bicycle.

When the object is too heavy or too large for a backpack or other bicycle mounted pouch, a trailer may be attached to the bicycle. The trailer may be towed behind the bicycle and allows the bicyclist to transport heavy and large objects that otherwise would not be transportable by bicycle.

When the weight of the object is too heavy, transportation of the object from point A to point B becomes more difficult especially as the terrain becomes steep or the distances become large. In this circumstance, motorized bicycles have been utilized to assist the bicyclist in powering the bicycle and trailer. Unfortunately, the addition of a motor creates other problems such as additional weight on the bicycle when the trailer is not in use or jack knifing when the motor is mounted to the trailer to drive the wheels of the trailer.

Accordingly, there is a need in the art for an improved system.

BRIEF SUMMARY

The trailer and bicycle discussed herein address the needs discussed above, discussed below and those that are known in the art.

The bicycle may be retrofitted with a transmission or may be designed with the transmission. The transmission is added to the rear wheel of the bicycle. The transmission when receiving power transmits such power to the rear wheel of the bicycle to propel the bicycle forward. The trailer may be removably attachable to the bicycle, and more particularly, to the transmission which may be retrofitted to the bicycle. The trailer may have a motor mounted thereon. The motor through a mechanical coupling provides power to the transmission. This set up is beneficial in that the weight of the motor is carried by the trailer so that the rider does not need to carry the weight of the motor when the trailer is detached from the bicycle. Moreover, the motor provides power to the rear wheel of the bicycle instead of the wheels of the trailer itself. This mitigates any unstable situation such as jack knifing. Additionally, the motor and other components mounted to the trailer maintain a low center of gravity so that attaching the trailer with motor to the bicycle does not cause instability of the trailer.

More particularly, a human powered vehicle is disclosed. The vehicle may comprise a rear wheel having a hub; a trailer removably attachable to the hub of the rear wheel; and a motor attached to the trailer and mechanically coupled to the hub of the rear wheel so that the motor can drive the hub and rear wheel of the bicycle.

The wheels of the trailer may be free spinning. In other words, the motor does not drive the wheels of the trailer. The trailer may have two wheels.

The vehicle may further comprise a first bevel gear fixedly attached to the hub; a second bevel gear engaged to the first bevel gear and operative to transmit power to the hub through the first bevel gear; and a drive axle attached to an output shaft of the motor. The first and second bevel gears may be seated within a housing.

A switch mounted to a forward portion of the vehicle such as the handlebar to control the motor of the trailer. The switch and the motor may be in wireless communication.

A plurality of drive axles may be attached to the motor and the hub for transferring power from the motor to the rear wheel of the vehicle. The drive axles may be connected to each other with knuckle joints. A sleeve may be fixedly attached to the trailer with at least one of the drive axles rotationally embedded within the sleeve. The sleeve may be curved to allow the vehicle to make a left or right turn.

An axle of the wheels of the trailer may be at about the same level as the hub of the rear wheel of the vehicle.

It is contemplated that the vehicle may be a bicycle.

Additionally, a trailer for a human powered vehicle is disclosed. The trailer may comprise a storage area; a free wheeled suspension system for rolling the storage area; and a motor attached to the storage area and mechanically coupleable to a rear wheel of the vehicle to rotate the rear wheel of the vehicle.

The free wheeled suspension system may have two wheels.

A plurality of drive axles may be coupled to the motor and coupleable to the rear wheel of the vehicle wherein the plurality of drive axles transfers the power of the motor to the rear wheel of the vehicle.

The trailer may further comprise a battery for powering the motor; a switch mountable to a handlebar of the vehicle; and a controller operative to regulate an amount of power provided by the battery to the motor; wherein the switch is in communication with the controller to increase or decrease the amount of power the battery supplies to the motor to increase or decrease a speed of the vehicle when the trailer is in use.

It is contemplated that the trailer may be used in conjunction with a bicycle.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Referring now to the drawings, a bicycle 10 with a trailer 12 attached to the rear portion 58 of the bicycle 10 is shown. The trailer 12 may have a motor 14 mechanically coupled to the rear hub 16 of the rear wheel 18 of the bicycle 10. The motor 14 drives the rear hub 16 and the rear wheel 18 of the bicycle 10 to propel the rider, bicycle 10 and trailer 12 in the forward direction. The trailer 12 carries the motor 14. Beneficially, the trailer 12 can be conveniently removed or attached to the bicycle 10 so that the bicyclist does not need to carry the weight of the motor 14 when the trailer is not in use. More particularly, when the trailer 12 is attached to the bicycle 10, the trailer 12 carries the weight of the motor 14 and assists the bicyclist in propelling the bicycle 10 and the trailer 12 forward by powering the rear wheel 18 of the bicycle. When the trailer 12 is not in use (i.e., detached from the bicycle 10), the motor 14 does not add additional weight to the bicycle 10 because the motor 14 is mounted to the trailer 12 and not the bicycle. Another benefit of mounting the motor to the trailer instead of the bicycle is that the rider/bicycle's center of gravity remains the same. Additionally, the motor 14 may be mounted under a loading platform 36 of the trailer 12. In this manner, the trailer 12 has a low center of gravity and is more stable.

Figure 1:
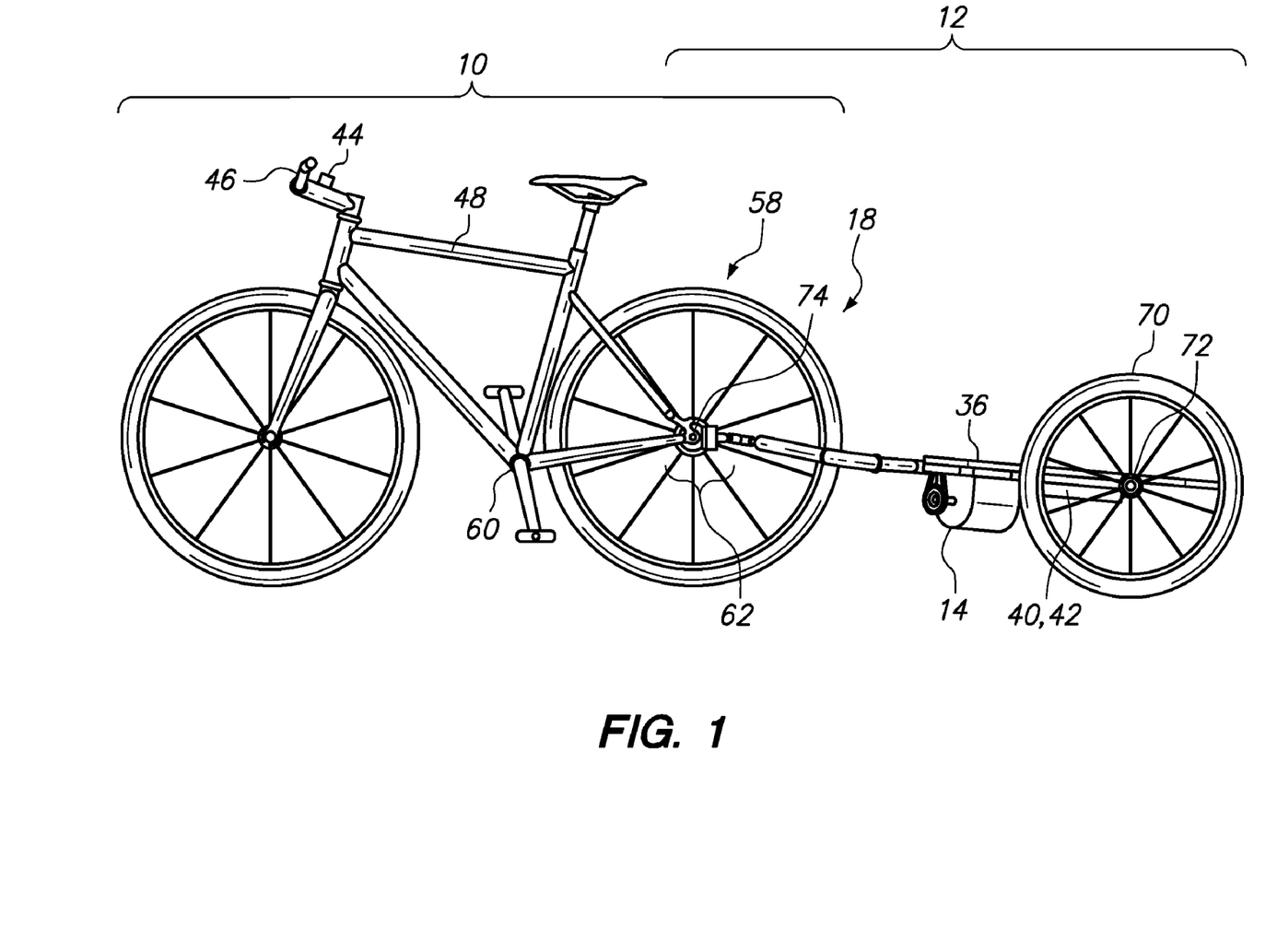
FIG. 1 is a side view of a bicycle with a removably attachable trailer wherein a motor is mounted to the trailer that powers a rear wheel of the bicycle.

Referring now to FIG. 1, the trailer 12 may be pulled behind the bicycle 10 which provides for a stable configuration. The trailer 12 may be attached to the bicycle 10 at the rear portion 58 of the bicycle 10. The loading platform 36 of the trailer 12 may be used to mount the motor 14, battery 40 and controller 42. Preferably, the motor 14, battery 40 and controller 42 are disposed generally at the height of the bottom bracket shell 60 of the bicycle 10. The reason is to maintain a low center of gravity of the trailer 12 so that the trailer 12 does not tip over when traversing over uneven terrain.

Figure 2:
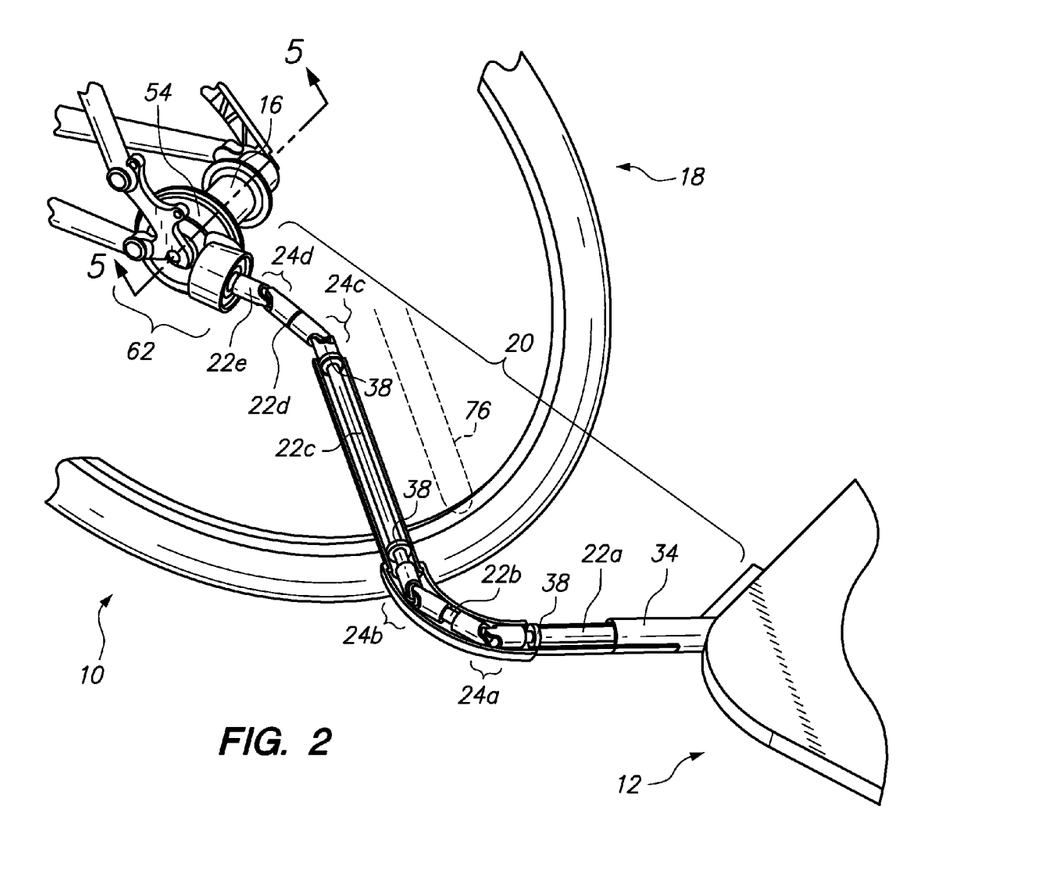
FIG. 2 is a top perspective view of a hitch arm of the trailer shown in FIG. 1.
Figure 3:
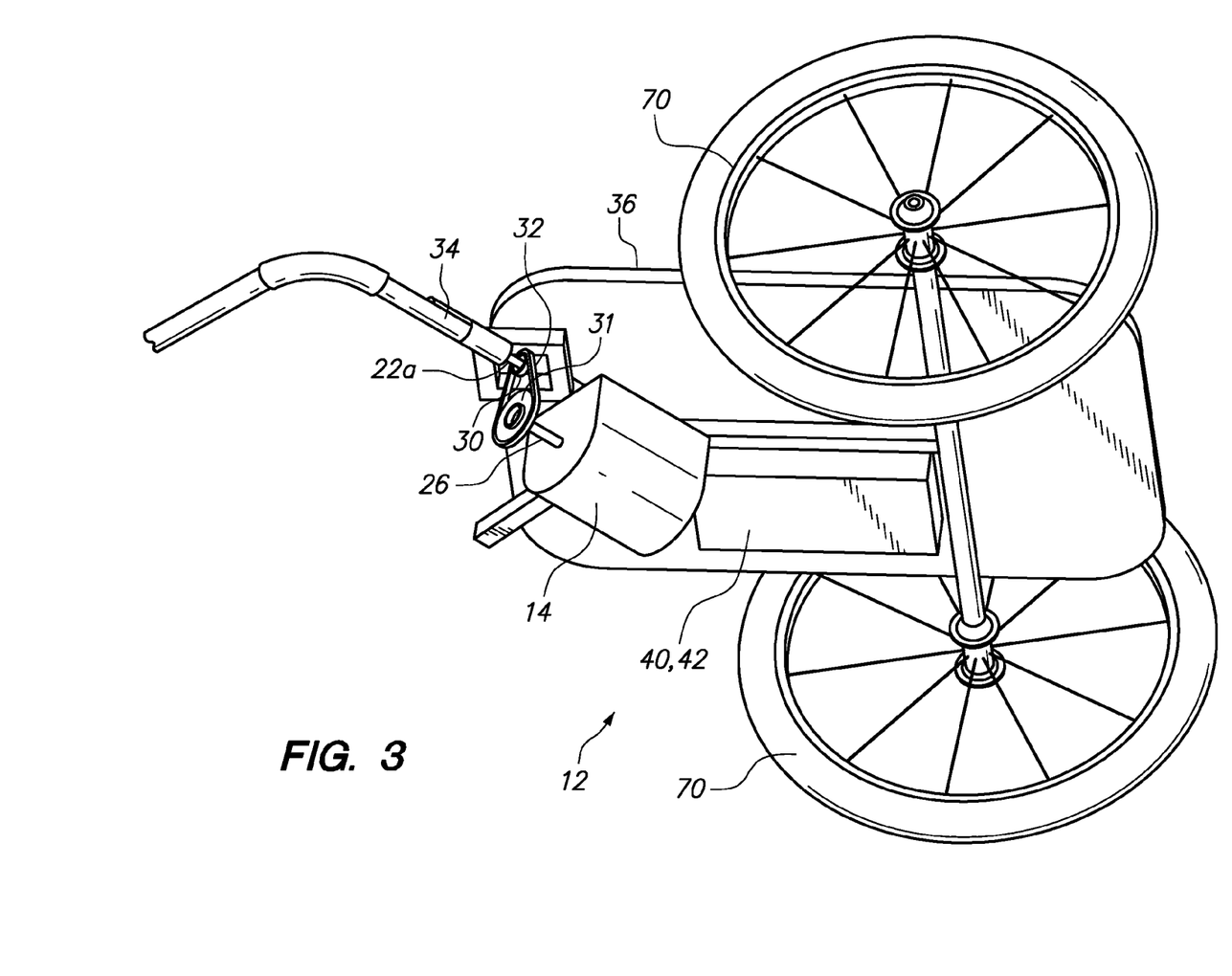
FIG. 3 is a bottom perspective view of the trailer shown in FIG. 1.

Referring now to FIG. 2, a hitch arm 20 connects the trailer 12 to the bicycle 10. The hitch arm 20 may have a plurality of drive axles 22a-e which are connected to each other by knuckle joints 24a-e. The knuckle joints 24a-e provide multi-axes freedom so that the drive axles 22a-e can rotate. The drive axle 22a may be mechanically coupled to the output shaft 26 of the motor 14 as shown in FIG. 3. In particular, the drive axle 22a may have a first pulley or gear 30 fixedly attached to the drive axle 22a. A second pulley or gear 31 may also be attached to the output shaft 26 of the motor 14. The pulleys or gears 30, 31 of the drive axle 22a and the output shaft 26 may be connected to each other by a belt, chain or other device 32 to transfer the rotational motion of the output shaft 26 to the drive axle 22a.

When the output shaft 26 rotates, the power of the output shaft 26 is transferred to the drive axle 22a through the belt 32. The drive axle 22a is held in a stationary position by sleeve 34. A cross section of the sleeve 34 is shown. The sleeve 34 is rigid and covers the drive axles 22a-c. The sleeve 34 may be fixedly attached to the loading platform 36 of the trailer 12 with welding, nuts and bolts, etc. or other methods known in the art or developed in the future. The drive axle 22a is allowed to rotate within the sleeve 34 by way of bearings 38, as shown in FIG. 2. One or more bearings 38 may be located within the sleeve 34 to support the drive axle 22a so that the drive axle 22a does not mar up or damage the interior surface of the sleeve 34.

Rotational power of the drive axle 22a is transferred to drive axle 22e by way of drive axles 22b, c and d. The sleeve 34 may extend outward from the rear wheel 18 of the bicycle 10 to allow the user to make a right turn. When the bicyclist makes a right turn, the back side of the rear wheel 18 would move toward the sleeve 34. The curve in the sleeve 34 allows the back side of the rear wheel 18 to enter the space defined by the curvature of the sleeve 34 as shown by dash lines 76 in FIG. 2. The rear wheel 18 does not hit the sleeve 34 but rather fits within the space created by the curved sleeve 34. The sleeve 34 may also house drive axle 22b as well as drive axle 22c. Two bearings 38 may support the drive axle 22c within the sleeve 34 to prevent damage to the sleeve 34 by rotation of the drive axle 22c. Drive axle 22b connects drive axles 22a and c within the sleeve 34 and allows the bend or curve within the sleeve 34. Knuckle joint 24a and 24b allow the drive axles 22a, b and c to turn in unison or rotate within the sleeve 34 and transmit power to the drive axles 22d and e. Drive axle 22e is connected to transmission 62. The knuckle joints 24c and d allow the trailer 12 to move up and down and left and right with respect to the bicycle 10 so that the bicycle 10 and trailer 12 can traverse over uneven terrain and turn left and right. It is contemplated that the sleeve 34 and drive axles 22a-e may be mounted on the opposite side of the bicycle 10.

Referring now to FIG. 3, the battery 40 and the controller 42 may be mounted to the underside of the loading platform 36. The battery 40 may provide power to the motor 14 to rotate the output shaft 26. The battery 40 may also be rechargeable and replaced when defective. The controller 42 is operative to regulate the amount of power that the battery 40 provides to the motor 14. The user may have a switch 44 (see FIG. 1) located on the handlebar 46 of the bicycle 10 that communicates with the controller 42. The switch 44 is operative to command the controller 42 to send more or less power to the motor 14 from the battery 40 to speed up or slow down the output shaft 26. The switch 44 may communicate with the controller 42 through wireless communication or wired communication that is routed through the frame 48 of the bicycle 10 and sleeve 34.

Figure 4:
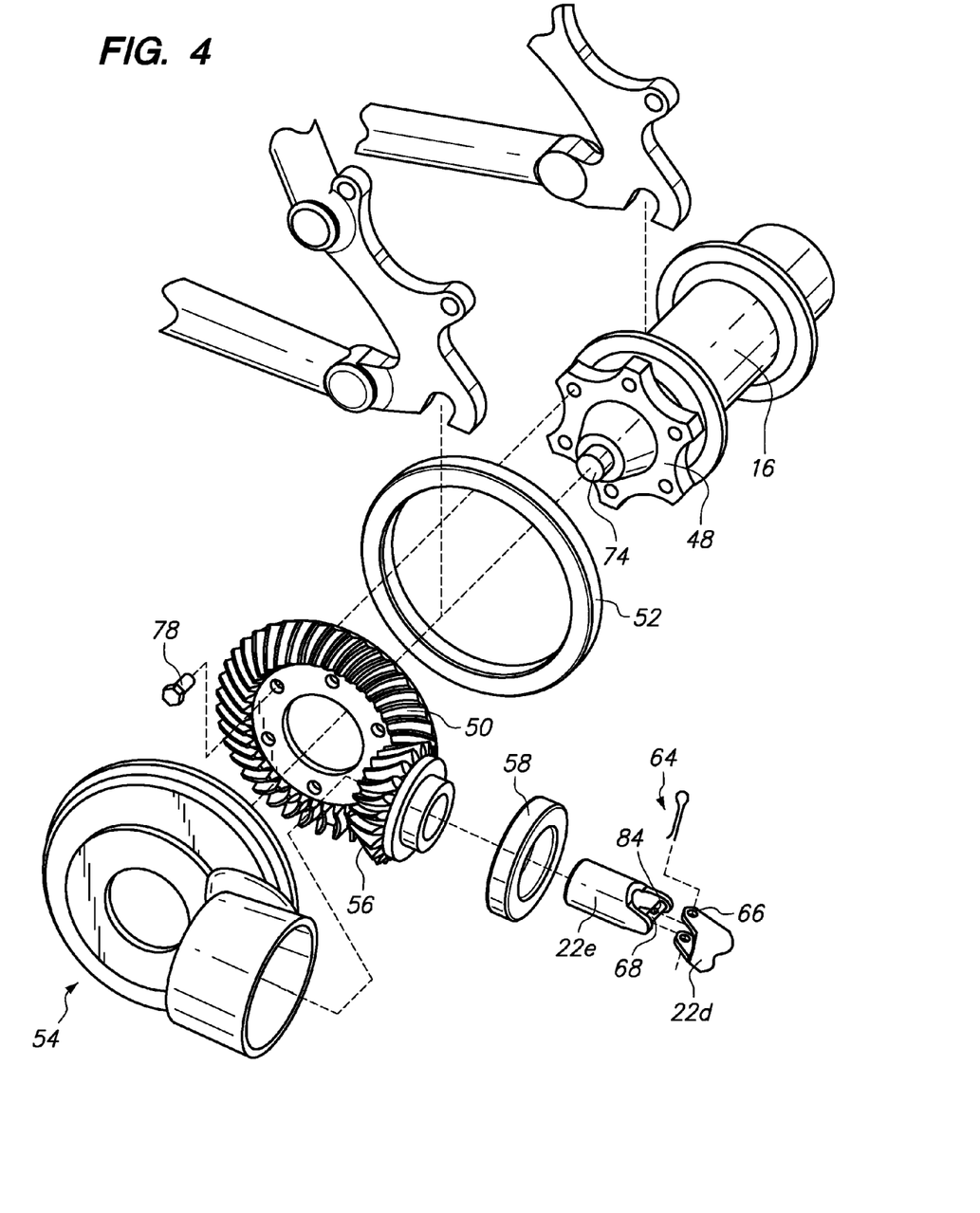
FIG. 4 is an exploded perspective view of a transmission that interconnects the trailer and the bicycle shown in FIG. 1.

Referring now to FIG. 4, an exploded view of the rear wheel hub area of the bicycle is shown. The rear hub 16 may have a standard mounting bracket 48 for a brake disc. A first bevel gear 50 may be mounted to the mounting bracket 48 with six screws 78 (only one is shown in FIG. 4 for clarity) that attach the first gear 50 to the mounting bracket 48. A ring gear 52 may be mounted to the outer periphery of the first bevel gear 50. A housing 54 (see FIG. 2) may be secured to the hub 16 by way of the ring gear 52. More particularly, the ring gear 52 is seated within a first portion 80 of the housing 54. The ring gear 52 allows the first bevel gear 50 to rotate within the housing 54.

Second bevel gear 56 may be mounted to a second portion 82 of the housing 54 by way of ring gear 58. The ring gear 58 is secured to the housing 54. The drive axle 22e is secured to the second bevel gear 56 so that as drive axle 22e rotates, the second bevel gear 56 rotates. The teeth of the second bevel gear 56 mesh with the teeth of the first bevel gear 50. The second bevel gear 56 transmits power to the first bevel gear 50 which transmits power to the rear axle 74 and rear wheel 18.

Figure 5:
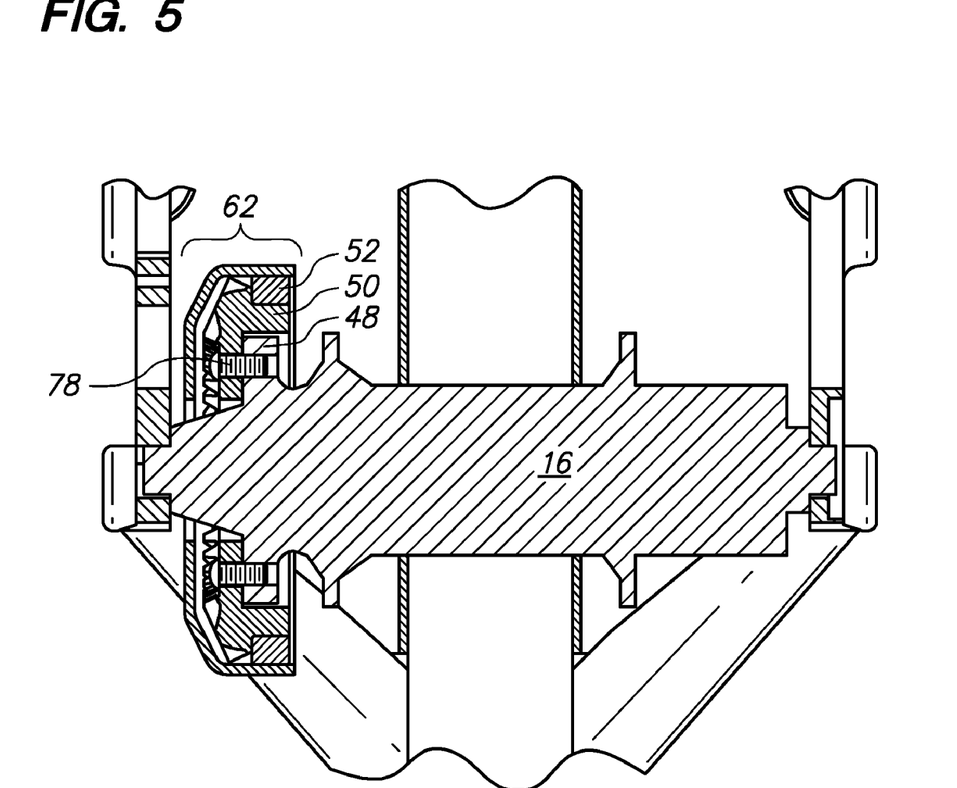
FIG. 5 is a cross sectional view of the transmission and a hub shown in FIG. 2.

Referring now to FIG. 5, a cross sectional view of an assembled hub 16 and transmission 62 is shown. The transmission 62 may be mounted to a rear wheel hub 16 that can accept a disk brake. In particular, the rear wheel hub 16 may have a mounting bracket 48 for the disc of the disc brake. Instead of mounting a disc to the mounting bracket 48, the transmission 62 may be mounted to the mounting bracket 48. The first bevel gear 50 of the transmission 62 is secured to the mounting bracket 48 with screws 78. The first ring bearing 52 is seated onto the outer periphery of the first bevel gear 50. The housing 54 is mounted to the first ring bearing 52.

Referring back to FIG. 4, the trailer 12 may be removed from the bicycle 10 by way of a cotter pin 64. The cotter pin 64 connects the drive axle 22d to the drive axle 22e. More particularly, the cotter pin 64 may be inserted into an aperture 66 formed within the drive axle 22d. When the cotter pin 64 is inserted into the aperture 66, the cotter pin 64 also enters an aperture (not shown) formed in a cross member 68 of the drive axle 22e. To remove the trailer 12 from the bicycle 10, the cotter pin 64 is removed to disengage the drive axle 22d from the drive axle 22e. To reattach the trailer 12 to the bicycle 10, the aperture 66 is aligned to the cross member 68 of the drive axle 22e. The cotter pin 64 is inserted into the aperture 66 to reengage the drive axle 22d and 22e. Instead of a cotter pin 64, a ball lock pin or other attachment mechanism is also contemplated.

During use, the bicycle 10 may be used to ride around the local area for pleasure. For this purpose, the trailer 12 may be detached from the bicycle 10. In particular, the bicyclist removes the cotter pin 64 to detach the drive axle 22d from the drive axle 22e. The trailer 12 is left at home or at another secure location while the bicyclist rides his/her bicycle 10. The weight of the motor 14, controller 42 and battery 40 are not on the bicycle 10 but are on the trailer 12. Accordingly, the bicyclist can ride the bicycle 10 normally without having to pull the weight of the motor.

When a heavy load needs to be transported from point A to point B, the bicyclist may reattach the trailer 12 to the bicycle 10. In particular, the aperture 66 of the drive axle 22d may be aligned to the cross member 68 of the drive axle 22e. Cotter pin 64 is inserted into the aperture 66 to reattach the drive axle 22d and 22e. At this point, the battery 40 should be charged and operative to send power to the motor 14. Additionally, the switch 44 may be set to a speed of zero or off. The loading platform 36 may be loaded with the object to be transported between points A and B. With the object on the loading platform 36, the bicyclist may mount the bicycle 10 and prepare to move forward. The bicyclist may propel the bicycle 10 and trailer 12 in the forward direction by pedaling forward. Alternatively or additionally, the bicyclist may turn the switch 44 on to send a signal to the controller 42 so that power from the battery 40 is provided to the motor 14. The motor 14 rotates output shaft 26 and drive axles 22a-e. Rotation of the drive axles 22a-e transmits power to the rear wheel 18 by way of transmission 62. The rear wheel 18 propels the bicycle 10 and the trailer 12 forward. Since the object is being pulled on the trailer 12 by the bicycle 10, the stability of the bicycle 10 and trailer 12 is not compromised. The trailer 12 allows the bicyclist to transport objects that might too heavy or too large to carry in a backpack or shoulder bag. Additionally, the motor 14 allows the bicyclist to traverse steep terrain or distances that are too large for the bicyclist to pedal.

The trailer 12 may have two wheels 70 which provide stability to the loading platform 36 and any object that might be loaded thereon. The loading platform 36 may be configured to have sidewalls for containing the object being transported between points A and B or even be configured as a baby carrier. The axle 72 of the trailer 12 is shown in FIG. 1 as being lower than the rear axle 74 of the rear wheel 18. However, it is also contemplated that the axle 72 of the trailer 12 may be at or above the level of the rear axle 74 of the rear wheel 18. The loading platform 36 may also be formed so as to provide a level surface when the trailer 12 is attached to the bicycle 10.

Figure 6:
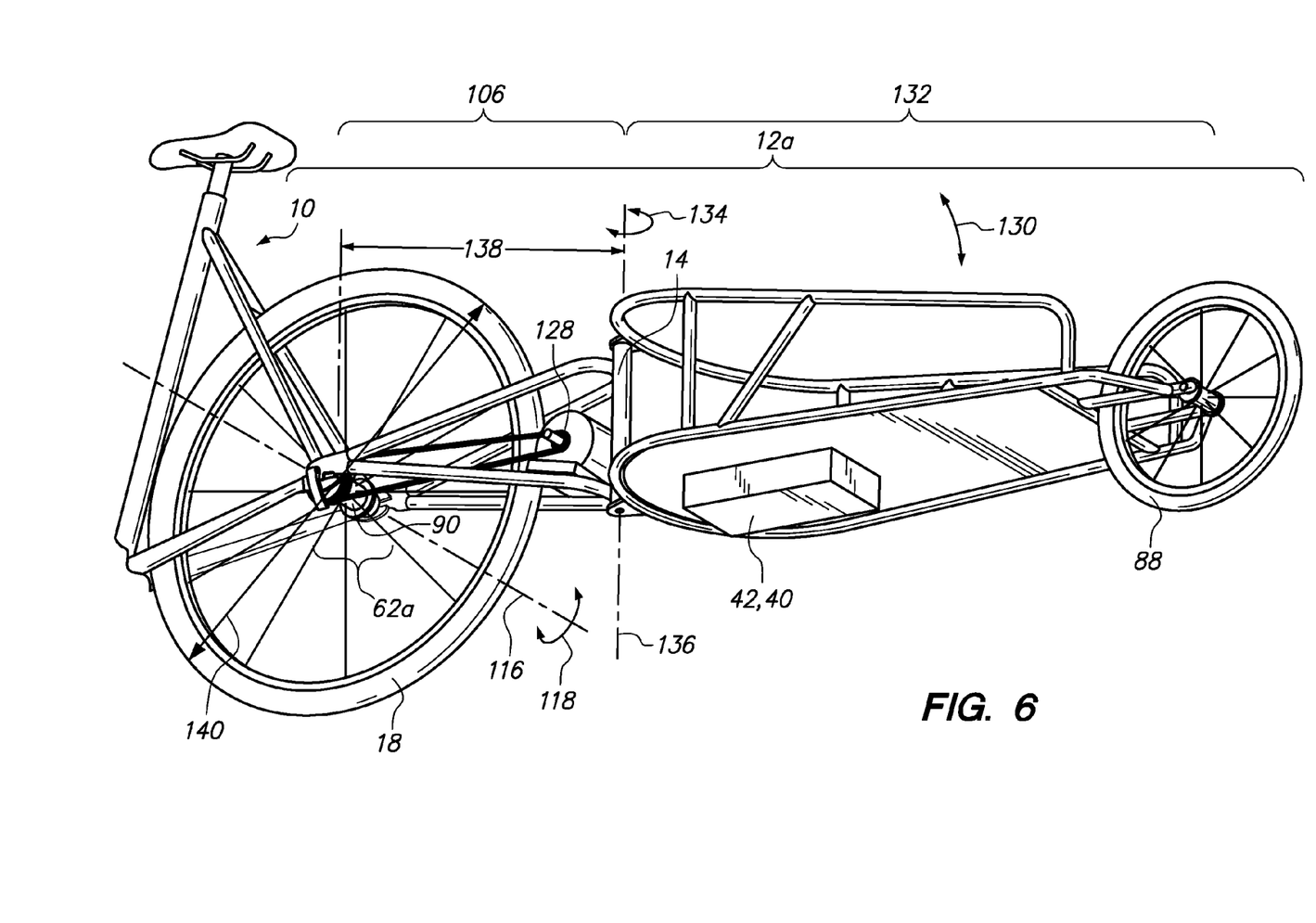
FIG. 6 is a bottom perspective view of a single wheel trailer mounted to the rear axle at a rear portion of the bicycle.
Figure 7:
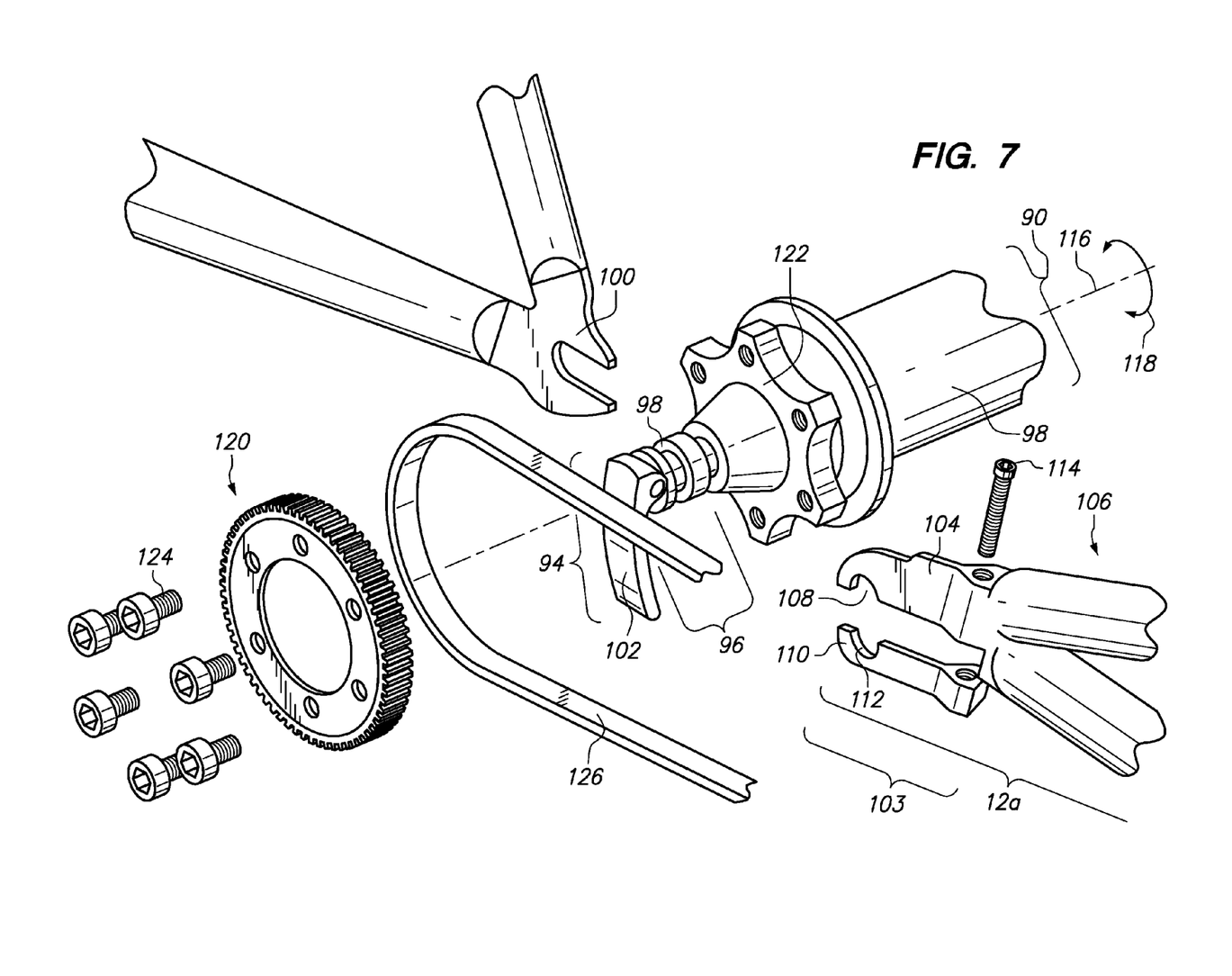
FIG. 7 is an exploded perspective view of a transmission for powering the rear wheel of the bicycle by way of the motor mounted to the trailer shown in FIG. 6.

Referring now to FIGS. 6 and 7, the trailer 12a may have a single wheel 88 instead of the dual wheel 70 shown in FIGS. 1-5. The single wheel version of the trailer 12a may be mounted to the rear axle 90 of the rear wheel 18 of the bicycle 10. The rear axle 90 is also shown in FIG. 7. The rear axle 90 may have a through axle 94 having a head 96 with a groove 98. The through axle 94 is inserted through the rear hub 98 so that the rear dropouts 100 of the bicycle 10 fit between the head 96 of the through axle 94 and the rear hub 98. The overcenter lever 102 may be actuated to secure the rear axle 90 of the rear wheel 18 to the rear dropouts 100.

The trailer 12a is mounted to the through axle 94, and more particularly, to the groove 98 formed on the head 96 of the through axles 94. The drop outs 103 of the trailer 12a may have an upper part 104 that may be secured or fixedly attached to the forward portion 106 of the trailer 12a. The upper part 104 has a circular recess 108 that mates with the groove 98 formed in the head 96 of the through axle 94. The drop outs 102 may also have a lower part 110. The lower part 110 may also have a circular recess 112 that mates with the groove 98. The upper and lower parts 104, 110 may be fastened together by way of bolt 114 to rotatably secure the trailer 12a to the bicycle 10. The recesses 108, 110 are sufficiently large to allow rotation about the rotational axis 116 defined by the rear axle 90. The trailer 12a can rotate up and down about the axis 116 as shown by rotational arrow 118.

Referring specifically to FIG. 7, a gear 120 may be attached to the mounting bracket 122 additionally used to mount a disc of a disc break. The gear 120 may be mounted to the mounting bracket 122 by way of bolts 124. A belt 126 or other drive transfer mechanism may be attached to the gear 120 and a sprocket 128 (see FIG. 6) of the motor 14. The belt 126 transfers power from the motor 14 to the rear wheel 18 of the bicycle 10. The motor 14 is preferably mounted to the forward portion 106 of the trailer 12a so that the motor 14 rotates about the rear axle 90. As such, the sprocket 128 of the motor 14 stays at a constant distance from the gear 120 as the bicycle 10 and trailer 12a traverse over uneven terrain and the trailer 12a pivots up and down as shown by arrows 118, 130.

The trailer 12a may also have a rear portion 132. The single wheel 88 of the trailer 12a is mounted to the rear portion 132. Moreover, the rear portion 132 is pivotally mounted to the forward portion 106 so that the rear portion 132 may pivot left and right as shown by arrow 134 about vertical pivot axis 136. Preferably, a distance 138 between the horizontal axis 116 and the vertical axis 136 is equal to or greater than a diameter 140 of the rear wheel 18.

The trailer 12a may operate in a similar fashion to the trailer 12 discussed above. By way of example and not limitation, motor 14 may be powered by a controller that is mounted to the rear portion 132 of the trailer 12a. The amount of power transmitted to the motor 14 may be controlled by the rider by way of a switch 44.

The above description is given by way of example, and not limitation. Given the above disclosure, one skilled in the art could devise variations that are within the scope and spirit of the invention disclosed herein, including various ways of attaching and detaching the trailer 12 from the bicycle 10. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A two wheeled human powered vehicle comprising:
   a rear wheel of the two wheeled human powered vehicle having a hub;
   a trailer having two wheels for supporting the trailer;
   a joint for providing at least two degrees of freedom, the joint being attached to the trailer and juxtaposed to the hub of the two wheeled human powered vehicle so that the trailer is pivotable to the two wheeled human powered vehicle in at least two degrees of freedom for allowing the vehicle to lean into a left or right turn and the trailer to follow the two wheeled human powered vehicle during the turn;
   a motor attached to the trailer and mechanically coupled to the hub of the rear wheel so that the motor can drive the hub and rear wheel of the two wheeled human powered vehicle.

2. The vehicle of claim 1 wherein the trailer has free spinning wheels.

3. The vehicle of claim 2 wherein an axle of the wheels of the trailer is at about the same level as the hub of the rear wheel of the vehicle.

4. The vehicle of claim 1 further comprising:
   first bevel gear fixedly attached to the hub;
   second bevel gear engaged to the first bevel gear and operative to transmit power to the hub through the first bevel gear; and
   a drive axle attached to an output shaft of the motor.

5. The vehicle of claim 4 wherein the first and second bevel gears are seated within a housing.

6. The vehicle of claim 1 further comprising a switch mounted to a forward portion of the vehicle to control the motor of the trailer.

7. The vehicle of claim 6 wherein the switch and the motor are in wireless communication.

8. The vehicle of claim 1 further comprising:
   a plurality of drive axles attached to the motor and the hub for transferring power from the motor to the rear wheel of the vehicle;
   a sleeve fixedly attached to the trailer with at least one of the drive axles rotationally embedded within the sleeve.

9. The vehicle of claim 8 wherein the sleeve is curved to allow the vehicle to make a left or right turn.

10. The vehicle of claim 8 wherein the drive axles are connected to each other with knuckle joints.

11. The vehicle of claim 1 wherein the vehicle is a bicycle.

12. The vehicle of claim 1 wherein the joint is a knuckle joint.

* * * * *